UNITED STATES PATENT OFFICE.

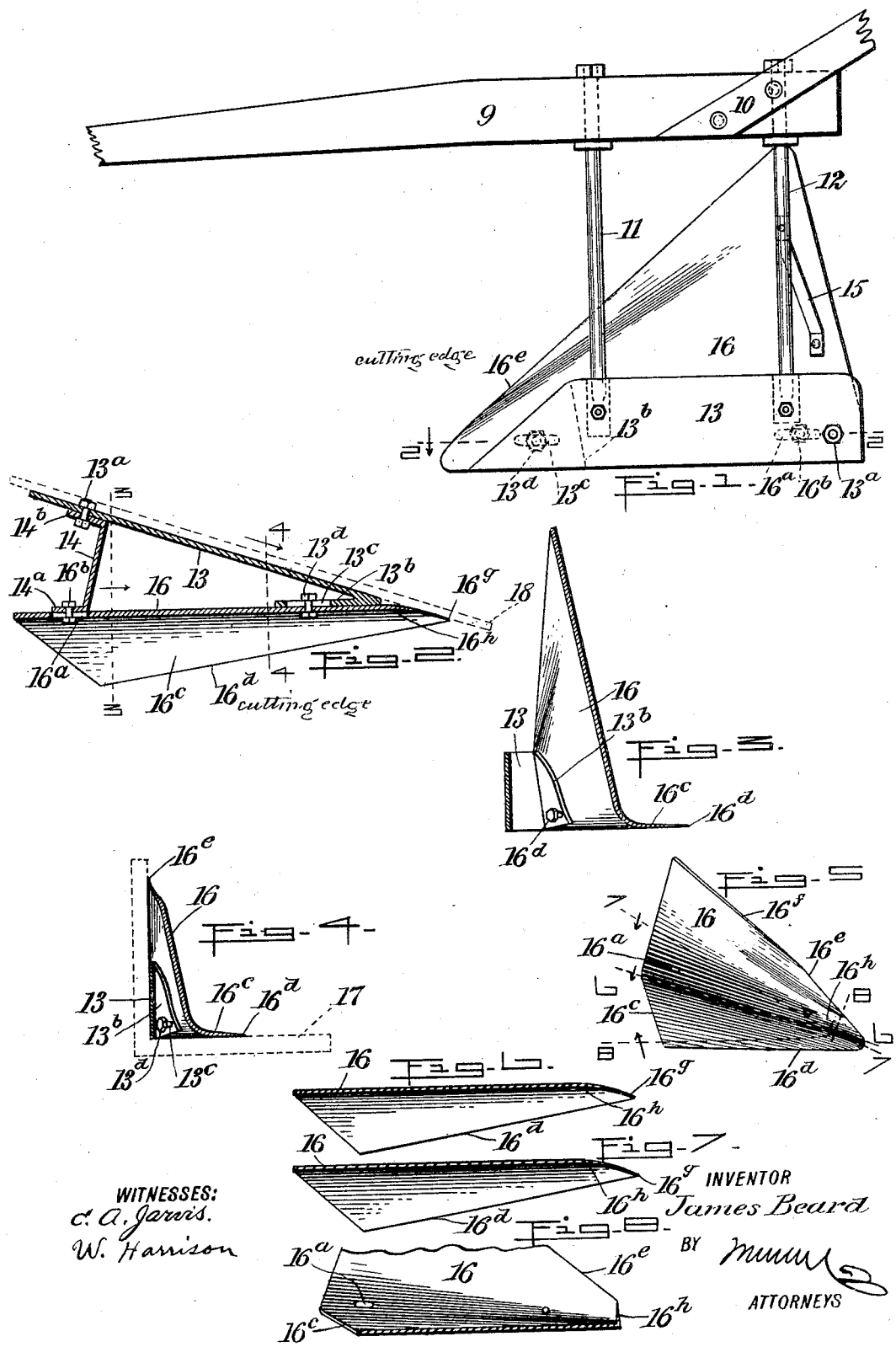

JAMES BEARD, OF WESTPORT, CALIFORNIA.

PLOW.

No. 798,317. Specification of Letters Patent. Patented Aug. 29, 1905.

Application filed March 2, 1905. Serial No. 248,016.

*To all whom it may concern:*

Be it known that I, JAMES BEARD, a citizen of the United States, and a resident of Westport, in the county of Mendocino and State of California, have invented a new and Improved Plow, of which the following is a full, clear, and exact description.

My invention relates to plows, and more particularly to the shape given to the same in order to enable it to cut a comparatively wide furrow with small draft upon the horse and without liability to foul when used in sticky soils.

Reference is to be had to the accompanying drawings, forming a part of this specification, in which similar characters of reference indicate corresponding parts in all the figures.

Figure 1 is a fragmentary side elevation showing the plow ready for use. Fig. 2 is a horizontal section upon the line 2 2 of Fig. 1 looking in the direction of the arrow, but showing the plow facing in the direction opposite to that indicated in Fig. 1. Fig. 3 is a vertical section upon the line 3 3 of Fig. 2 looking in the direction of the arrow and showing the angle of inclination as between the general plane of the moldboard and one of its shearing edges. Fig. 4 is a section somewhat similar to that indicated in Fig. 3, but taken upon the line 4 4 of Fig. 2 looking in the direction of the arrow. Fig. 5 is a perspective view of the plow removed from its framework. Fig. 6 is a section through the same, taken upon the line 6 6 of Fig. 5 looking in the direction of the arrow. Fig. 7 is another section through the moldboard, taken upon the line 7 7 of Fig. 5 looking in the direction of the arrow; and Fig. 8 is a fragmentary perspective view, partly in section, the section being taken upon the line 8 8 of Fig. 5 looking in the direction of the arrow.

The plow-beam is shown at 9, the handle at 10, and the main or upright bolts at 11 12. The landside is shown at 13 and is provided with a bolt $13^a$ and with a wing $13^b$, the wing being integral with the body portion of the landside. The wing $13^b$ is provided with a slot $13^c$, which is substantially horizontal when the landslide is in normal position. Passing through this slot $13^c$ is a bolt $13^d$ for the purpose of connecting the landside with the moldboard. A brace 14 is provided at its opposite ends with feet $14^a$ $14^b$, as indicated in Fig. 2. Another brace 15 is connected with the upright bolt 12 and with the moldboard 16. The latter is provided with a slot $16^a$, so disposed as to be horizontal when the moldboard is in normal position. Passing through this slot is a bolt $16^b$, which engages the foot $14^a$, as will be understood from Figs. 1 and 2. The moldboard is provided with a portion $16^c$, which is substantially horizontal when the plow is in normal position, and this portion $16^c$ tapers at $16^d$ to a cutting edge. The portion $16^c$ and its cutting edge I designate as a "shear." The opposite edge $16^e$ of the moldboard is also sharp for a portion of its length, as will be understood from Figs. 4 and 5, though the continuation $16^f$ of this edge may be made comparatively dull. The point $16^g$ is of the shape indicated and, like the shearing edges $16^d$ and $16^e$, is sharp.

The shape of the plow is such that if a straight-edge be laid upon its surface extending backward from an imaginary point $16^h$ located about fourteen inches from the cutting-point $16^g$ in a plow of ordinary size the straight-edge is free to engage any part of the inner surface of the plow. For instance, the straight-edge can be laid in a position coincident with any of the section-lines 6 6, 7 7, or 8 8 (indicated in Fig. 5) and yet touch all adjacent parts of the surface of the plow. In other words, no matter what may be the ratio of the inclination between the body of the moldboard and its shear portion $16^c$ there is no curvature between the point $16^h$ and the surface of the moldboard immediately adjacent thereto and extending backwardly therefrom in several directions which may be as radiating from the imaginary point $16^h$. (See Figs 5, 6, 7, and 8.) The landside 13 and the moldboard 16 are so fitted relatively to each other that the upper cutting edge $16^e$ of the moldboard is exactly in alinement with the external surface of the landside 13. This can best be understood by examining Fig. 4, in which a square 17 (shown in dotted lines) is placed against the plow. As will be seen from this figure, the cutting edge $16^b$ and the bottom edge of the landside 13 rest flatly upon one leg of the square, whereas the external face of the landside 13 and the cutting edge $16^e$ rest flatly against the other leg of the square. From this view it is apparent that the upper cutting edge $16^e$ or shear of the moldboard is in exact alinement with the general plane formed by the exterior surface of the landside 13 and at the same time the two lowermost points of the plow—to wit, the shearing edge 16$^b$ and the lower edge of the landside 13—are in a horizontal position. The purpose of the arrangement just described is to enable the upper cutting edge or shear 16$^e$ to split the soil directly ahead of the outer plane surface of the landside 13 in such manner that this landside glides smoothly against the undisturbed wall of the soil. In other words, the smooth flat external face of the landside 13 is intended to glide along a wall of undisturbed soil, the cutting edge or shear 16$^e$ defining the line of demarcation through the soil and the moldboard removing the portion which is severed by the plow. The idea is that when the entire cutting-surface of the plow, and especially the cutting edge 16$^e$, removes a mass of loose earth the landside 13 should be so disposed that its outer flat smooth face should glide easily against the remaining wall of earth, so that there is a true coaction between the position of the cutting edge or shear 16$^e$ and the general plane of the landside. Referring again to the shape of the plow, it will be noted further that when a portion of soil is once severed from the earth the severed portion in traveling backward relatively to the moldboard 16 and to the shear 16$^e$ does not describe any curvature, but travels in a straight line. In other words, no matter whether a given quantity of earth follows a line coincident to the section-lines 6 6, 7 7, or 8 8 in Fig. 5 or follows any other line which according to geometrical considerations it ought to follow it need not move in a curve. This feature I consider very important for a reason which I found from experience—to wit, that after the soil or dirt is severed by either shear of the plow this soil or dirt should be allowed to take the straight course in order to disengage itself from the moldboard. In other words, I have found that if the soil after being severed is compelled to describe a curve it tends to foul the plow, for the reason that it tends to fill up the center of the curve, thus arbitrarily producing a comparatively flat surface. I have noticed, for instance, that in using a plow which had a large surface curving sharply along those portions indicated by the section-lines in Fig. 5 the clay had a tendency to stick to the intermediate portions of the moldboard and sometimes has caked upon such portions to a thickness of two inches, there being little or no clay at the front and the back of the moldboard. It seems that the soil dislodged in following the path of least resistance tends automatically to fill up any depression or concave surface presented to its flow and arbitrarily forms a surface made of dirt, but having no curvature in the direction above indicated. For this reason I give my plow such conformity as to avoid the undesirable curvature in the radial direction pointed out and have found upon actual trial that a plow constructed as above indicated will make a much wider furrow of the same depth and without additional fatigue upon the part of the horse or other animal drafting the plow.

As the cutting edges of the plow gradually wear away it is desirable to change the relative position of the landside 13. In order to do this, the bolts 13$^d$ and 16$^b$ are loosened, the landside 13 moved slightly by virtue of the slots 16$^a$ and 13$^c$, and the bolts again tightened. By this means the landside 13 can always be kept in proper relation to the moldboard. As indicated in Fig. 2, a straight-edge 18 can be laid along the external face of the landside 13 and the moldboard 16 so adjusted that the point 16$^g$ is in alinement with the outer surface of the landside. If for any reason the landside should be worn off or should become warped or otherwise distorted, the bolts may be adjusted substantially in the manner just described so as to bring the landside 13 and the point 16$^g$ again into proper alinement.

Having thus described my invention, I claim as new and desire to secure by Letters Patent—

1. In a plow, the combination of a moldboard provided with a point, a landside connected with said moldboard and provided with a surface alined with said point, and means controllable at will for adjusting the position of said landside relatively to said moldboard.

2. In a plow, the combination of a moldboard provided with oppositely-disposed shear edges, and a landside connected with said moldboard, said landside being provided with a plane surface disposed in alinement with one of said shear edges, and further provided with an upwardly-extending edge in alinement with another of said shear edges.

3. In a plow, a moldboard provided with a sharp point for engaging the soil to be severed, and further provided with a surface sloping in straight lines from an imaginary point disposed comparatively near said sharp point in said moldboard.

4. In a plow, a moldboard having a shear edge bent relatively thereto, said moldboard being of such conformity that a number of straight lines 1 1, 6 6, 8 8, if drawn from a certain imaginary point 16$^h$ so as to diverge as described, touch the surface of said moldboard throughout practically the entire length of said lines.

In testimony whereof I have signed my name to this specification in the presence of two subscribing witnesses.

JAMES BEARD.

Witnesses:
 MARION CUSHING,
 DENNIS NYHEN.